(12) United States Patent
Kodama et al.

(10) Patent No.: US 10,599,854 B2
(45) Date of Patent: Mar. 24, 2020

(54) VEHICULAR DATA CONVERSION APPARATUS AND VEHICULAR DATA OUTPUT METHOD

(71) Applicant: DENSO CORPORATION, Kariya, Aichi-pref. (JP)

(72) Inventors: Tomoko Kodama, Kariya (JP); Minoru Okada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 242 days.

(21) Appl. No.: 15/503,846

(22) PCT Filed: Aug. 6, 2015

(86) PCT No.: PCT/JP2015/003964
§ 371 (c)(1),
(2) Date: Feb. 14, 2017

(87) PCT Pub. No.: WO2016/031149
PCT Pub. Date: Mar. 3, 2016

(65) Prior Publication Data
US 2017/0270305 A1 Sep. 21, 2017

(30) Foreign Application Priority Data
Aug. 26, 2014 (JP) ................................. 2014-171546

(51) Int. Cl.
*G06F 21/60* (2013.01)
*G06F 21/62* (2013.01)
(Continued)

(52) U.S. Cl.
CPC .......... *G06F 21/60* (2013.01); *G06F 21/6218* (2013.01); *G06F 21/6245* (2013.01);
(Continued)

(58) Field of Classification Search
CPC .. G06F 21/60; G06F 21/6218; G06F 21/6245; H04L 63/101; H04L 67/12
See application file for complete search history.

(56) References Cited

U.S. PATENT DOCUMENTS 5,935,248 A 8/1999 Kuroda et al.
2004/0214599 A1* 10/2004 Ogino ....................... G06F 8/61
455/556.1
(Continued)

FOREIGN PATENT DOCUMENTS

JP H 09116534 A 5/1997
JP 2006237881 A 9/2006
(Continued)

OTHER PUBLICATIONS

PoolView-: Stream Privacy for Grassroots Participatory Sensing written by Raghu K. et al. SENSYS '08 Proceedings of the 6th ACM Conference on Embedded Network Sensor Systems, ACM, New York, NY USA, Nov. 5, 2008 (Nov. 5, 2008), pp. 281-294.

*Primary Examiner* — Yonas A Bayou
(74) *Attorney, Agent, or Firm* — Harness, Dickey & Pierce, P.L.C.

(57) ABSTRACT

A vehicular data conversion apparatus includes: an acquisition portion that acquires vehicle data from a vehicle; a first storage portion that stores a data processing method for outputting the vehicle data to an outside of the vehicle in accordance with a classification level corresponding to the vehicle data acquired by the acquisition portion; and an output portion that outputs the vehicle data that has been converted in accordance with the data processing method stored in the first storage portion.

21 Claims, 10 Drawing Sheets

(51) Int. Cl.
  *H04L 29/06* (2006.01)
  *H04L 29/08* (2006.01)
  *H04L 12/40* (2006.01)
  *G07C 5/00* (2006.01)
(52) U.S. Cl.
  CPC .......... *H04L 63/101* (2013.01); *H04L 67/12* (2013.01); *G07C 5/008* (2013.01); *H04L 2012/40273* (2013.01)

(56) References Cited

U.S. PATENT DOCUMENTS

| | | | |
|---|---|---|---|
| 2005/0120320 A1* | 6/2005 | Uozumi | G06F 17/5022 702/182 |
| 2006/0092032 A1* | 5/2006 | Manlove | B60N 2/002 340/667 |
| 2006/0190729 A1 | 8/2006 | Uchida | |
| 2007/0039059 A1 | 2/2007 | Andoh | |
| 2007/0192596 A1 | 8/2007 | Otsuka | |
| 2007/0273205 A1* | 11/2007 | Aoyama | H02J 7/245 307/3 |
| 2009/0146802 A1* | 6/2009 | Jung | G01D 1/16 340/531 |
| 2009/0327933 A1* | 12/2009 | Dunn | G06F 16/447 715/764 |
| 2011/0175594 A1* | 7/2011 | Funato | G01R 29/08 324/72 |
| 2013/0182844 A1* | 7/2013 | Nagai | H04L 63/068 380/259 |
| 2013/0219170 A1 | 8/2013 | Naitou et al. | |
| 2013/0304308 A1 | 11/2013 | Maruyama et al. | |
| 2014/0033319 A1* | 1/2014 | Kesavan | G06Q 10/00 726/26 |
| 2014/0282899 A1* | 9/2014 | Baldwin | G06F 21/62 726/4 |
| 2014/0317729 A1 | 10/2014 | Naitou et al. | |
| 2015/0039300 A1* | 2/2015 | Mochiki | G10L 21/0208 704/226 |
| 2015/0296376 A1* | 10/2015 | Mabuchi | H04L 12/40169 380/270 |
| 2015/0350176 A1* | 12/2015 | Mabuchi | H04L 9/3271 726/6 |

FOREIGN PATENT DOCUMENTS

| | | |
|---|---|---|
| JP | 2006279848 A | 10/2006 |
| JP | 2006344128 A | 12/2006 |
| JP | 2007048047 A | 2/2007 |
| JP | 2013193598 A | 9/2013 |
| JP | 2013201510 A | 10/2013 |
| WO | WO-2011152042 A1 | 12/2011 |

\* cited by examiner

FIG. 3

| | DATA RESOLUTION | UPDATE TIMING | ENCRYPTION SYSTEM | |
|---|---|---|---|---|
| CLASSIFICATION LEVEL I | RAW DATA | NO LIMITATION | NO ENCRYPTION | ~L |
| CLASSIFICATION LEVEL II | DISREGARD DIGITS AFTER DECIMAL POINT | | RSA | ... |
| CLASSIFICATION LEVEL III | SET RESOLUTION TO BE A1 TIMES | UPDATE CYCLE A2 | AES | |
| CLASSIFICATION LEVEL IV | INHIBIT OUTPUT | | | |

DATA PROCESSING, DATA UPDATING PROCESS

START

U1 — READ DATA PROCESSING METHOD

U2 — CALCULATE RESOLUTION

U3 — DO ENCRYPTION PROCESS

U4 — WRITE DATA

END

FIG. 7

| CLASSIFICATION LEVEL | MASK FOR RESOLUTION |
|---|---|
| I | 1111 1111 |
| II | 1111 1100 |
| III | 1111 0000 |
| IV | — |

VEHICULAR DATA CONVERSION APPARATUS AND VEHICULAR DATA OUTPUT METHOD

CROSS REFERENCE TO RELATED APPLICATIONS

This application is a U.S. National Phase Application under 35 U.S.C. 371 of International Application No. PCT/JP2015/003964 filed on Aug. 6, 2015 and published in Japanese as WO 2016/031149 A1 on Mar. 3, 2016. This application is based on and claims the benefit of priority from Japanese Patent Application No. 2014-171546 filed on Aug. 26, 2014. The entire disclosures of all of the above applications are incorporated herein by reference.

TECHNICAL FIELD

The present disclosure relates to a vehicular data conversion apparatus and a data output method that output data from an inside of a vehicle to an outside of the vehicle.

BACKGROUND ART

For example, a technology in which users are classified according to attributes such as posts or affiliation, and a user of an apparatus is limited according to this classification has been developed (referring to Patent Literature 1, for example) as means for limiting an apparatus usable by each user. According to the technology described in Patent Literature 1, a user management table stores user identification information, authentication information, and usable function information. When user authentication information is registered by a user registration/deletion means, and when a user authentication means determines that the user is an authenticated user of an apparatus, the apparatus is usable for only the function to be permitted to be used by the user.

The inventors of the present application have found the following.

Recently, vehicle information used in a vehicle has been requested from outside the vehicle, and the vehicle data is utilized outside the vehicle. However, when vehicle data having high confidentiality can be directly accessed from the outside of the vehicle, vehicle data having high importance may directly be manipulated from the outside of the vehicle or the read vehicle data may be misused. Applying the authentication technology described in Patent Literature 1 is insufficient to enhance security performance of vehicle data.

PRIOR ART LITERATURES

Patent Literature

Patent Literature 1: JP 2006-344128 A

SUMMARY OF INVENTION

It is an object of the present disclosure to provide a vehicular data conversion apparatus and a vehicular data output method that enable enhancement of security performance of vehicle data stored in a vehicle.

A vehicular data conversion apparatus according to one aspect of the present disclosure includes: an acquisition portion that acquires vehicle data from a vehicle; a first storage portion that stores a data processing method for outputting the vehicle data to an outside of the vehicle in accordance with a classification level corresponding to the vehicle data acquired by the acquisition portion; and an output portion that outputs the vehicle data that has been converted in accordance with the data processing method stored in the first storage portion. Further, according to one aspect of the present disclosure, a vehicular data output method is provided.

According to the vehicular data conversion apparatus and the vehicular data output method, vehicle data is acquired from the inside of the vehicle, and the vehicle data converted according to the data processing method stored in the first storage portion in association with the vehicle data is output, whereby the security of the vehicle data stored in the vehicle can be enhanced.

BRIEF DESCRIPTION OF DRAWINGS

The above and other objects, features, and advantages of the present disclosure will become more apparent from the following detailed description with reference to the accompanying drawings, in the drawings:

FIG. 3 is a view illustrating the content of an access control list that illustrates one example of classification of vehicle data and data processing methods;

FIG. 6 is a flowchart schematically illustrating the contents of a data processing and data updating process;

FIG. 7 is a diagram illustrating an example of mask data for a resolution calculation process;

DESCRIPTION OF EMBODIMENTS

Figure 1:
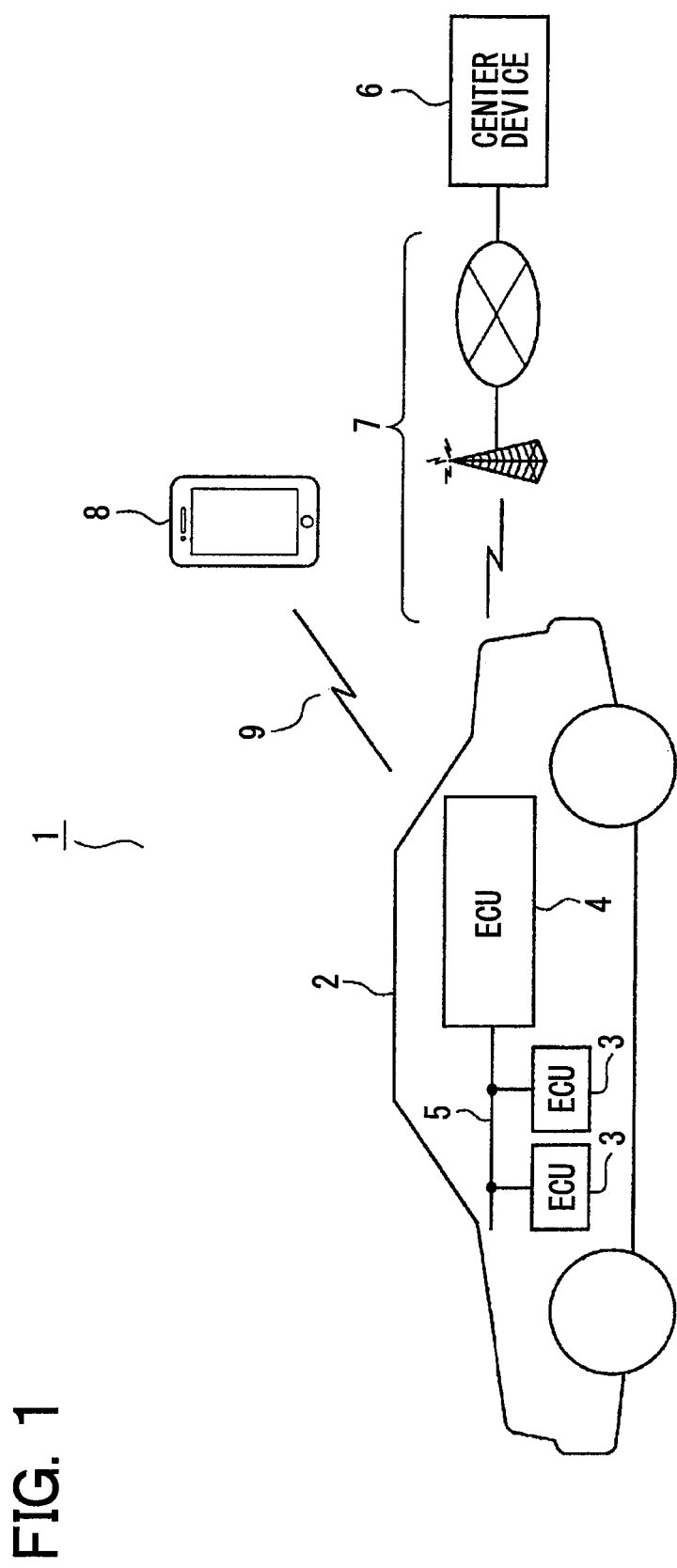
FIG. 1 is a block diagram schematically illustrating an electric configuration of a transmission/reception system of vehicle data according to a first embodiment.

Some embodiments of a vehicular data conversion apparatus and a vehicular data output method will be described below with reference to the drawings. In each embodiment, the components performing the same or similar operations are identified by the same reference numerals, and the description thereof will be omitted as necessary.

First Embodiment

Firstly, the schematic configuration of a vehicular transmission/reception system 1 will be described with reference to FIG. 1. As illustrated in FIG. 1, many ECUs 3 and 4 are installed in a vehicle 2, and the ECUs 3 and 4 are connected to one another through an in-vehicle LAN (Local Area Network) 5. The ECUs 3 and 4 acquire sensor information from sensors (not illustrated) provided in the vehicle 2, and drive actuators (not illustrated) such as a motor on the basis of the sensor information. In this case, the ECUs 3 and 4 can implement high-performance technology due to development of vehicle environment performance, safety, comfortableness, eco technology, and the like, in comparison with a conventional art. There are several thousands to tens of thousands of vehicle data handled in one vehicle, and contents of these vehicle data are updated, when necessary, according to daily technological evolution (for example, PHV (Plug-in Hybrid Vehicle)) concerning a vehicle control.

Recently, as illustrated in FIG. 1, a system has been developed in which a center device 6 outside the vehicle makes an access to the ECUs 3 and 4 in the vehicle through an external communication network 7 (that may include a wired communication network such as a mobile telephone network, for example) that is developed outside the vehicle, to request vehicle data used in the vehicle, and the center device 6 utilizes this vehicle data. Further, in accordance with the recent development of short distance wireless communication technology, wireless LAN technology, or the like, a mobile terminal 8 such as a tablet terminal installed inside or outside the vehicle can make an access to the vehicle data using an external communication 9. The system of the external communication 9 employs wireless LAN, short distance wireless communication (for example, Bluetooth (registered trademark)), or the like. However, when the center device 6 or the mobile terminal 8 can directly access to highly confidential vehicle data retained in the vehicle, the apparatus 6 or the mobile terminal 8 may directly manipulate the vehicle data having high importance, and the read vehicle data may be misused. In view of this, in the present embodiment, the ECU 4 for security is connected to the in-vehicle LAN 5 as illustrated in FIG. 1. To distinguish the ECU 4 for security from the other ECUs 3, the ECU 4 is referred to as a data processing apparatus 4 below.

Figure 2:
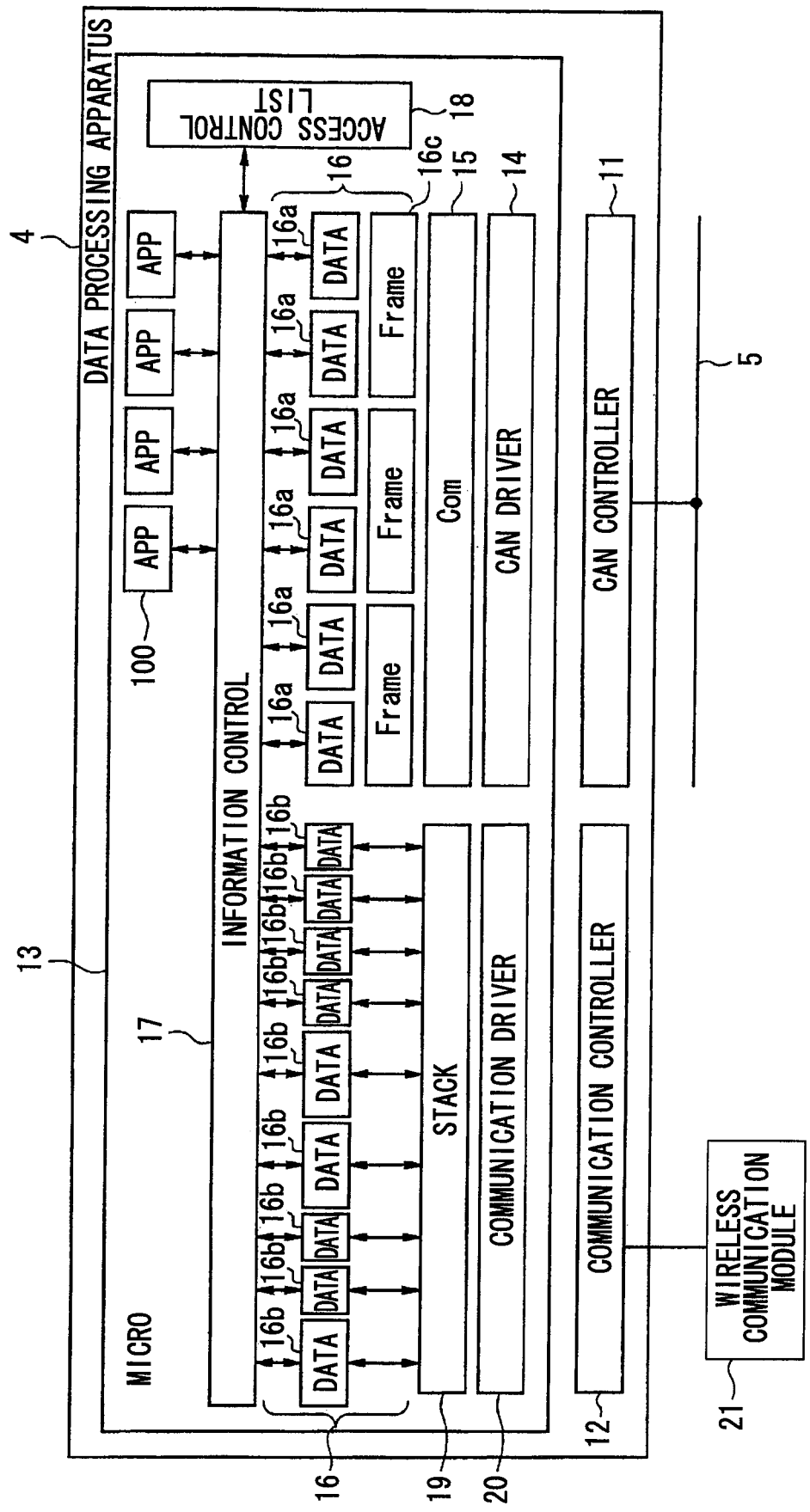
FIG. 2 is a block diagram schematically illustrating the electric configuration of a vehicle data processing apparatus.

The schematic configuration of the data processing apparatus 4 serving as a vehicular data conversion apparatus will be described with reference to FIG. 2. FIG. 2 schematically illustrates the electric configuration of the data processing apparatus 4 in the form of a block diagram. The data processing apparatus 4 includes an ECU that performs processing as necessary when vehicle data is requested from the outside of the vehicle, and determines whether it is all right to output the vehicle data, which has been processed or has not been processed, to the outside of the vehicle. The processing indicates a process for limiting resolution of data precision, a process for changing an update cycle of data, a process for changing an encryption system of data according to the confidential level, or the like. Only the data that is approved by the data processing apparatus 4 to be output to the outside of the vehicle can be output to the outside of the vehicle through a communication apparatus. Accordingly, highly confidential information in the vehicle such as a control content is prevented from being grasped from the outside of the vehicle.

The data processing apparatus 4 includes a CAN (Controller Area Network) controller (transceiver) 11, an external connection communication controller (transceiver) 12, and a microcomputer 13. The CAN controller 11 establishes communication connection with the in-vehicle network 5 through CAN, for example. The microcomputer 13 is connected to the CAN controller 11 by a CAN driver 14 to establish communication with the other ECUs 3 connected to the in-vehicle network 5. CAN is one example of a network standard and related device usable for an in-vehicle device.

The microcomputer 13 mainly includes a communication module (Com) 15, a data storage portion 16 that holds various data, an information control portion 17 that serves as a conversion portion, an access control list storage portion (corresponding to a first storage portion) 18 that stores an access control list L (referring to FIG. 3), and an external connection stack (corresponding to an output portion) 19, and an application 100 can use data processed by the information control portion 17.

The access control list storage portion 18 is configured by a volatile memory or a non-volatile memory, for example, and stores the access control list L. The access control list storage portion 18 is configured such that its storage content is rewritable by the information control portion 17. In the present embodiment, the data storage portion 16 is configured by a register, for example, and is separated into an in-vehicle communication buffer (corresponding to an acquisition portion) 16a and an external communication buffer (corresponding to a second storage portion) 16b. Concerning the in-vehicle communication buffer 16a in the data storage portion 16, the portion of a frame 16c of CAN data is one to eight bytes, and the data of the frame 16c is divided into individual data and periodically updated by a reception signal from the in-vehicle network 5.

Here, the present embodiment describes the system using CAN as the in-vehicle communication. However, LIN may be used for the in-vehicle communication to establish communication connection. It is to be noted that the configuration illustrated in FIG. 2 can be commonly used for the frame 16c and the data format of the in-vehicle communication buffer 16a handled in a lower layer from the communication module 15 in CAN and LIN.

Vehicle data acquired from the in-vehicle network 5 is periodically stored in the in-vehicle communication buffer 16a, and the information control portion 17 processes the stored vehicle data on the basis of the access control list L (see FIG. 3) stored in the access control list storage portion 18 and allows the external communication buffer 16b to hold the resultant data as necessary. As for the later-described data to which the update cycle is defined, the external communication buffer 16b may be prepared in the number corresponding to the number of classifications defined in the access control list L for the individual stored data in the in-vehicle communication buffer 16a.

The external connection stack 19 collectively stores data held in the external communication buffer 16b. The microcomputer 13 is connected to the external connection communication controller 12 by an external connection communication driver 20, and the external connection communication controller 12 is connected to a communication network 7 outside the vehicle through a wireless communication module 21, for example. With this, the microcomputer 13 in the data processing apparatus 4 can be communicatively connected to the communication network 7, thereby being capable of communicating with a device outside the vehicle, such as the center device 6 or the mobile terminal 8.

The classification of vehicle data will be described here. As described above, there are several thousands to tens of thousands of vehicle data handled in one vehicle. The vehicle data are classified into several types beforehand, and a classification level corresponding to a security level is determined according to the classifications. The present embodiment describes the case where vehicle data are classified into classification levels I to IV in ascending order of confidentiality and important degree (security level).

The vehicle data in the classification level I is specified as information that can be directly confirmed by the user of the vehicle, for example. It is, for example, meter display information (for example, speed meter information) acquired by the user seeing a gauge panel in the vehicle. Here, the meter display information is the data processed for meter display by the ECU 3 mounted in the vehicle 2. Therefore, the meter display information itself has the lowest confidentiality and importance, and is set as the classification level I. The vehicle data in the classification level I is grouped according to this type.

The vehicle data in the classification level II is defined as sensor information such as a retrofitted sensor by the user of the vehicle 2, for example. In the case where the user of the vehicle 2 externally mounts a navigation system (not illustrated) to the inside of the vehicle 2 after purchasing the vehicle body, the externally mounted navigation system may output information, such as various road information (latitude/longitude information, gradient value of a ground level), to various ECUs 3 through the in-vehicle network 5. Various information described above output from the externally mounted device is relatively low in confidentiality and importance, and set as the classification level II. The vehicle data in the classification level II is also grouped according to this type.

The vehicle data in the classification level III is defined as information of an assembled module assembled to the vehicle 2 in advance, for example. A navigation system assembled to the vehicle (not illustrated) outputs information, such as various road information (latitude/longitude information, gradient value of a ground level), to various ECUs 3 through the in-vehicle network 5 in almost the similar way to the externally-mounted navigation system described above. Further, raw data from various sensors (not illustrated) such as a vehicle speed sensor, a precipitation sensor, and various pressure sensors is relatively high in confidentiality and importance, and classified into the classification level III. The vehicle data in the classification level III is also grouped according to this type.

The vehicle data in the classification level IV is defined as raw information of an estimated value dependent on estimation logic, for example. Examples of such vehicle data include raw data of estimated torque of an axle and raw data of an estimated gradient value of a ground level. Such information is dependent on know-how of a supplier of the assembled module for the vehicle 2. When such information is externally output, the know-how of the estimation logic might be exposed according to the raw information of the estimated value. In view of this, such data is set as the classification level IV having the highest confidentiality and importance. The vehicle data in the classification level IV is also grouped according to this type.

Next, the detail of the access control list L stored in the access control list storage portion 18 will be described. The access control list L indicates a list in which data processing methods for outputting vehicle data to the outside of the vehicle are stored in association with vehicle data acquired from the inside of the vehicle according to the level of the importance and the level of the confidentiality of the data. FIG. 3 schematically illustrates the detail of the access control list L in data transfer between the outside and inside of the vehicle.

The access control list L describes data processing methods concerning data resolution, update timing, and encryption system according to the classification levels I to IV described above, for example. Notably, the data processing method is not limited to these three types, and one or two of the types of the above-mentioned processing methods or various other data processing methods other than the above-mentioned processing method can be used.

As illustrated in FIG. 3, the access control list storage portion 18 stores the data processing method such that the security level of the vehicle data is raised with the increase in the above-mentioned classification levels (I→II→III→IV). That is, the classification level I corresponds to the lowest level, and the classification level IV corresponds to the highest level. As for the data resolution, the access control list storage portion 18 stores that raw data itself can be output in the classification level I, while in the classification level II, a rounding processing for disregarding digits after the decimal point is performed to raw data.

The access control list storage portion 18 also stores that the process for setting resolution to be A1 times the resolution of raw data is performed for data in the classification level III. Further, as for the update timing, the access control list storage portion 18 stores that there is no limitation for data in the classification levels I and II, while an output process is performed only with an update cycle A2 (>basic cycle) for data in the classification level III. As for the encryption method, the access control list storage portion 18 stores that encryption is not performed for data in the classification level I, while encryption system with high security such as RSA (registered trademark) or AES is used for data in the classification levels II and III. In addition, the access control list storage portion 18 stores that data in the classification level IV is never output. As described above, the data processing methods according to the respective classification levels I to IV are stored in the access control list storage portion 18.

Figure 4:
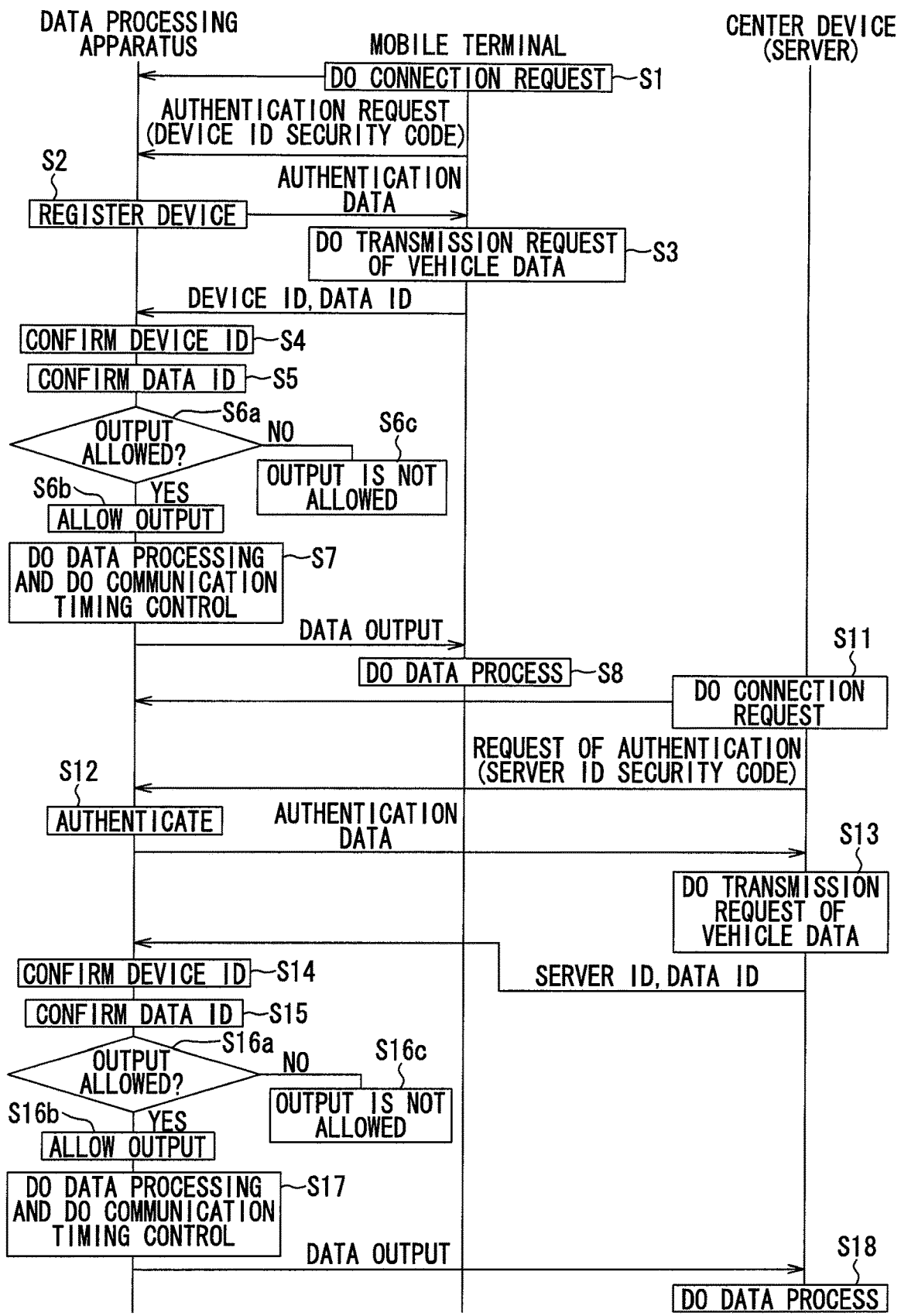
FIG. 4 is a sequence diagram schematically illustrating an overall flow.

Next, an operation procedure in the case where the center device 6 or the mobile terminal 8, which is the device outside the vehicle, accesses to vehicle data flowing through the in-vehicle network 5 via the external network to request the vehicle data will be described with reference to FIG. 4. FIG. 4 illustrates an entire schematic operation sequence. Note that the process by the data processing apparatus 4 in FIG. 4 mainly indicates the process executed by the microcomputer 13.

Firstly, when the center device 6 or the mobile terminal 8 intends to acquire vehicle data in the vehicle 2, a device authentication registration is performed in advance. In the case of authentication registration of the mobile terminal 8 to the data processing apparatus 4 in the vehicle by the user of the mobile terminal 8, the mobile terminal 8 firstly issues a request of connection to the data processing apparatus 4 (S1). At that time, the mobile terminal 8 requests authentication by transmitting a device ID and security code (device ID security code) of the mobile terminal 8 to the data processing apparatus 4, and the data processing apparatus 4 returns authentication data according to the device ID and the security code to the mobile terminal 8, and thus, the device registration is completed (S2). Notably, the authentication procedure of the mobile terminal 8 is not limited to the method described above.

When the mobile terminal 8 requests the transmission of vehicle data (S3), the data type (data ID) of the requested data is transmitted to the data processing apparatus 4 along with the device ID. After confirming the device ID of the mobile terminal 8 (S4) and the data ID (S5), the data processing apparatus 4 allows the output of the vehicle data (S6*b*) under the condition in which the data can be output in the classification level described in the access control list L (S6a: YES). On the contrary, when this condition is not satisfied (S6a: NO), the data processing apparatus 4 does not allow the output of the vehicle data (S6c).

When allowing the output of the vehicle data, the data processing apparatus 4 processes the data as necessary, and then, outputs the processed data to the mobile terminal while controlling a communication timing (S7). With this, the mobile terminal 8 can perform a data process using this data (S8). The similar process is performed as well in the case where the center device 6 requests data through the connection to the data processing apparatus 4 (S11 to S18).

Next, the internal process of the data processing apparatus 4 will be described with reference to FIGS. 5 to 7. The microcomputer 13 in the data processing apparatus 4 extracts data from the in-vehicle network 5 on a frame basis (T1), and copies the data into the in-vehicle communication buffer 16a (T2). The information control portion 17 performs the data processing (T3), and copies the resultant data into the external communication buffer 16b (T4). The detail of the data processing is schematically illustrated in FIG. 6. As illustrated in FIG. 6, the information control portion 17 reads the data processing method from the access control list L in the access control list storage portion 18 (U1), calculates resolution (U2), stores that the encryption process stored in the access control list L is to be performed (U3), and writes the data (U4). It is to be noted that, in the interval of the data processing, a data falsification detection process according to the classification levels I to IV may be performed. The data falsification process may be performed such that the confidence is confirmed by issuing a certificate. Alternatively, when the storage value of the in-vehicle communication buffer 16a is different between the previous data and the current data, the data falsification may be detected whether or not the amount of change exceeds a threshold level. Alternatively, the data falsification may be detected by using an error detection code such as a checksum. According to this, the reliability of data accumulated in the in-vehicle communication buffer 16a or the external communication buffer 16b can be enhanced.

FIG. 7 illustrates mask data for the resolution calculation process according to the data classification level. The process for validating the data on the digit on which the mask data is "1" is performed, and the process for invalidating the data on the digit on which the mask data is "0" is performed. Specifically, data can be processed by validating only the high-order digits and invalidating the low-order digits. FIG. 7 illustrates the mask data that masks data in binary digit. However, the mask data is not limited thereto. Data can be masked in decimal digit (for example, "disregarding digits after the decimal point" indicated in the classification level II in FIG. 3). In this way, in the present embodiment, the data processing apparatus 4 processes data in advance before a request of data is issued from the outside.

Figure 5:
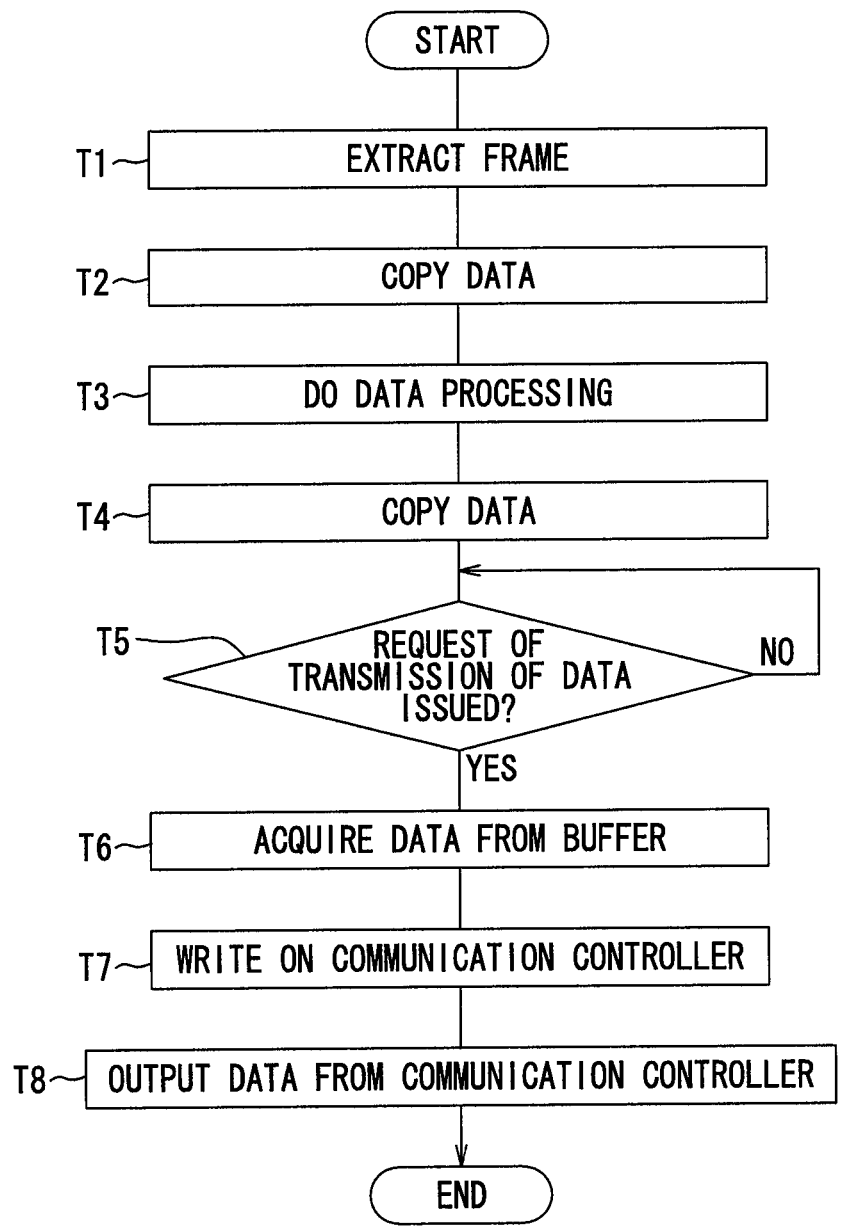
FIG. 5 is a flowchart schematically illustrating the content of processes executed by the data processing apparatus.

The information control portion 17 performs the data processing in step T3 in FIG. 5, and copies the data into the external communication buffer 16b in step T4. The information control portion 17 determines whether the updating process is performed or not to the copied data at every predetermined basic cycle (for example, 1 millisecond), and performs the updating process as necessary. The data updating control process performed by the information control portion 17 is schematically illustrated in FIG. 8.

Figure 8:
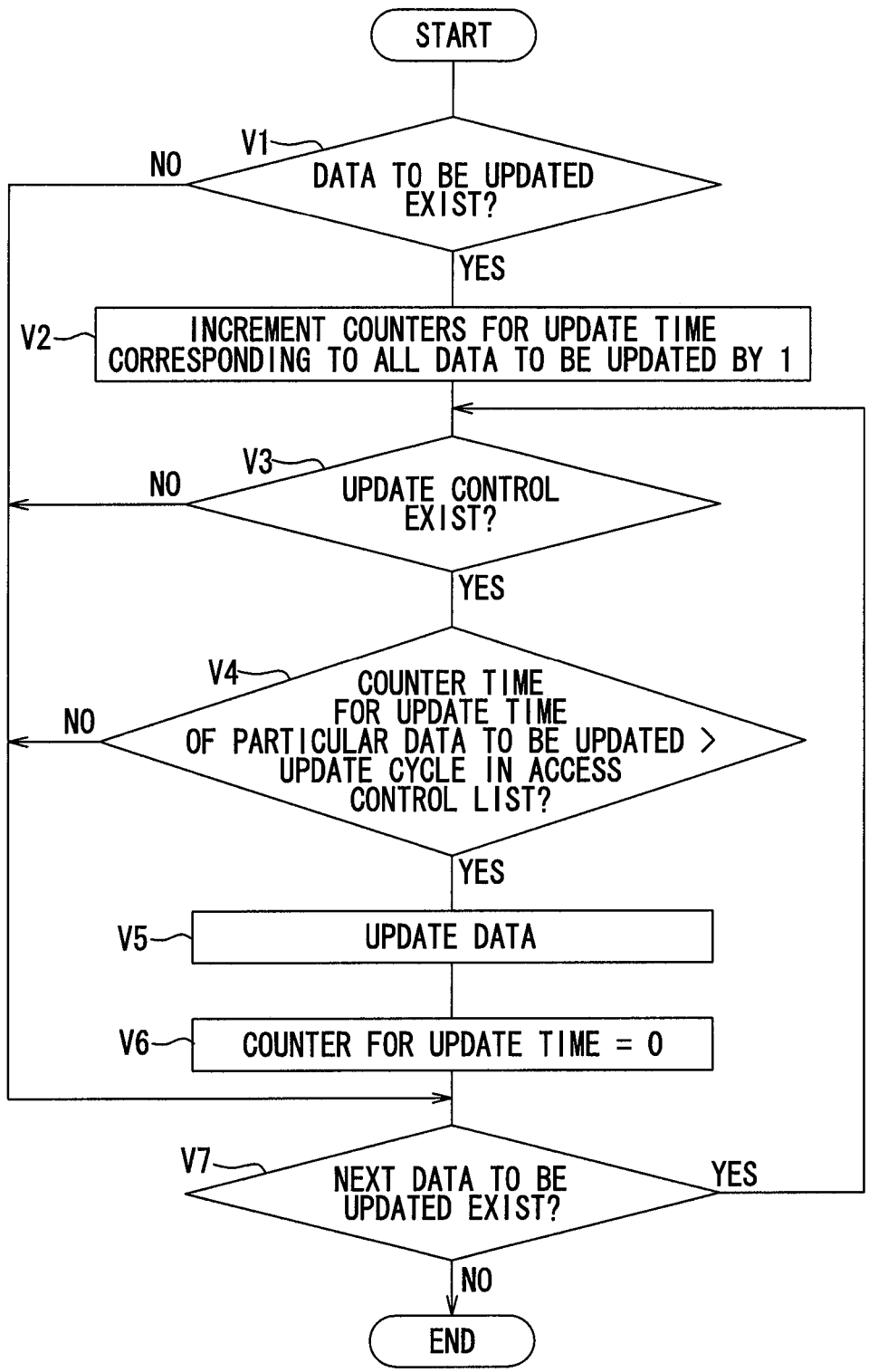
FIG. 8 is a flowchart schematically illustrating the content of a data update control process.

As illustrated in FIG. 8, the information control portion 17 determines whether or not data that is updated as necessary is present in the in-vehicle communication buffer 16a by referring to the in-vehicle communication buffer 16a (V1). When determining that the data to be updated is present (V1: YES), the information control portion 17 increments update time counters (not illustrated) corresponding to all data to be updated which is the update target (V2), and determines whether or not an update control is set for the target access level (classification level) (V3). Notably, the update time counters are preliminarily prepared in the microcomputer 13 so as to correspond to the individual data to be updated, for example.

When determining that the update control is set for the target access level (classification level), the information control portion 17 determines whether the time indicated by the update time counter for the data to be updated exceeds an update cycle (V4). When determining that the time exceeds the update cycle, the information control portion 17 updates the data in the external communication buffer 16b (V5), and sets the update time counter to zero (V6). The processes in V3 to V6 are performed for all data to be updated (V7: YES).

With this, the data to be updated is updated to the external communication buffer 16b, as necessary, according to the update timing corresponding to the classification levels I to IV held in the access control list L. The example illustrated in the access control list L in FIG. 3 will be described. As for the data classified into the classification levels I and II, all the data to be updated is immediately updated in synchronization with the update cycle of CAN data by the execution of the routine illustrated in FIG. 8, regardless of the contents of the update counters. The data classified into the classification level III is updated according to the update cycle A2 (>basic cycle: 100 milliseconds fixed cycle, for example) of the update counter. Thus, the update timing of data can be changed according to the security level.

For example, the timing at which the center device 6 or the mobile terminal 8, which is outside the vehicle, issues a request of transmission of data to the inside of the vehicle 2 does not coincide with the timing desirable for the configuration (ECUs 3 and 4) in the vehicle 2. Therefore, the data processing apparatus 4 causes the external communication buffer 16b to previously update the processed data according to the update cycle of the update counter according to the security level. Thus, even when the center device 6 or the mobile terminal 8 issues a request of transmission of data at any timing, the vehicle data can immediately be output in response to the request of transmission according to the security level of each data.

As illustrated in FIG. 5, the information control portion 17 in the microcomputer 13 in the data processing apparatus 4 processes data, copies the resultant data into the external communication buffer 16b, and performs the data update control as illustrated in FIG. 8 in Step T4. At that time, the microcomputer 13 determines whether the request of transmission of the data is issued (T5). When the request of transmission of the data is issued (T5: YES), the microcomputer 13 acquires the data from the external communication buffer 16b, and stores the data into the external connection stack 19 (T6). Then, the microcomputer 13 performs the encryption process stored in step U3, and writes the data on the external connection communication controller 12 from the external connection stack 19 (T7), and the external connection communication controller 12 outputs the data to the device issuing the request of transmission, such as the mobile terminal 8 or the center device 6 outside the vehicle, through the wireless communication module 21 (T8). In this way, the microcomputer 13 can output the data to the external device that issues the request of transmission, when the request of data is issued.

Specific Example 1

A specific example will be described below. For example, the case where the center device 6 outside the vehicle requires periodic presentation of wheel speed information communicated through a multiple bus in the in-vehicle network 5 will be described. The wheel speed information is communicated through the in-vehicle network 5, and periodically stored in the in-vehicle communication buffer 16*a*. The information control portion 17 reads the data processing method stored in the access control list L from the access control list storage portion 18. The information control portion 17 determines that the wheel speed information acquired through the in-vehicle network 5 is the data classified into the classification level III, and reads the data processing method stored in the access control list L from the access control list storage portion 18. It is supposed that such information indicates that ten-fold resolution is set as the "data resolution" of the vehicle speed information, and indicates as the "update timing" that the data is presented once after the data is received ten (=A2) times through the in-vehicle network.

Incidentally, the ten-fold resolution means as follows. Specifically, when the data is "50.23", "50.35", "51.23", "51.20", "51.25", "50.10", "50.33", "50.40", "50.45", "51.10", "51.21", and "51.00" in decimal notation, the figures below the first decimal place are disregarded, and thus, the data of "50.2", "50.3", "51.2", "51.2", "51.2", "50.1", "50.3", "50.4", "50.4", "51.1", "51.2", and "51.0" is output. It is to be noted that a rounding process may be employed. In addition, in the case where the data is presented once after the data is received ten times, "50.2" that is the first data and "51.2" that is the eleventh data are output to the external communication buffer 16*b*. The center device 6 issues the request of transmission of data to the data processing apparatus 4 after receiving authentication. After receiving the request of transmission, the data processing apparatus 4 acquires the data from the external communication buffer 16*b*, and transmits the data to the center device 6 through the wireless communication module 21. With this, the center device 6 can receive the data of "50.2" and "51.2" from the data processing apparatus 4.

Specific Example 2

The case where the mobile terminal 8 requests the data of water temperature of the engine communicated through the in-vehicle network 5 will be described in the specific example 2. The data of water temperature of the engine is communicated through the in-vehicle network 5, and periodically stored in the in-vehicle communication buffer 16*a*. The information control portion 17 reads the data processing method stored in the access control list storage portion 18 from the access control list L. It is supposed here that, as for the information of water temperature of the engine, disregarding the digits below the decimal point is set as the "data resolution", no limitation is set as the "update timing", and RSA is employed as the encryption, for example. The information control portion 17 stores the data of water temperature of the engine into the external communication buffer 16*b* after disregarding the digits after the decimal point.

After receiving the authentication from the data processing apparatus 4 in the vehicle, the mobile terminal 8 issues the request of transmission of data. When receiving the request of transmission, the data processing apparatus 4 encrypts the data of the water temperature of the engine stored in the external communication buffer 16*b* with RSA, and transmits the resultant data to the mobile terminal 8 through the wireless communication module 21. Thus, the mobile terminal 8 can receive the data of the water temperature of the engine from the data processing apparatus 4.

As described above, according to the present embodiment, the access control list storage portion 18 stores the data processing methods for outputting data to the outside of the vehicle according to the classification levels I to IV, and the data processing apparatus 4 outputs converted data converted on the basis of the data processing method corresponding to each of the classification levels I to IV from the external connection stack 19. Thus, the security of the vehicle data stored in the vehicle can be enhanced.

For example, when security measures are set for each of vehicles or each of vehicle data, a lot of man-hours are needed for not only setting these measures but also for ensuring quality. On the other hand, the present embodiment manages vehicle data in each of data groups classified according to the type of vehicle data, and these data groups are classified into the classification levels I to IV and managed.

Therefore, even when a new security policy is developed, there is no need to change and set a security level for each of vehicle data. In addition, even when vehicle data is added, it is only necessary to set such that the new vehicle data is added to a group of data in the classification levels I to IV preliminarily classified.

A development firm of a vehicular device may newly define vehicle data as a parameter during the development of the vehicular device and advances the development using the vehicle data. During the development, the vehicle data is classified into the classification levels I to IV as in the present embodiment, whereby a security level can be ensured. However, when many development firms join the development, the security policies may differ among these development firms.

In view of this, according to the present embodiment, vehicle data is grouped in the classification levels I to IV, and the information control portion 17 can change and set the vehicle data to any one of the classification levels I to IV in the access control list L stored in the access control list storage portion 18. With this, even when security policies differ among the development firms, the security level can be changed to the level satisfying the demand of these development firms. Thus, the present embodiment can flexibly respond to the policies of development firms.

The external communication buffer 16*b* stores converted data that has previously been processed, and when vehicle data is requested from the outside, the external communication buffer 16*b* outputs the converted data. Therefore, the external communication buffer 16*b* can immediately respond to the request of transmission of data issued from the outside.

Further, the external communication buffer 16*b* stores the converted data that has been previously processed for each of the classification levels I to IV of the vehicle data at the update timing stored in the access control list L in the access control list storage portion 18. Therefore, whether the update cycle is in synchronization with the data update cycle with CAN or the update cycle is the update cycle A2 longer than the basic cycle, the converted data can previously be prepared in the external communication buffer 16*b*, whereby the external communication buffer 16*b* can immediately respond to the request of transmission of data issued from the outside.

In addition, the microcomputer 13 sets the update cycle as the update cycle A2, for example, by changing the data update timing according to the data update cycle, and outputs the data with the internal update timing of the vehicle data and the output timing of the vehicle data being desynchronized. This configuration makes it difficult to estimate the cycle of the vehicle control, the control timing of the actuator by the ECU 3, and the like from the outside.

In addition, data is processed according to the attribute of vehicle data, and this can make it difficult to grasp information which is high in confidentiality and security level, such as the content of the vehicle control, from the outside of the vehicle.

Second Embodiment

Figure 9:
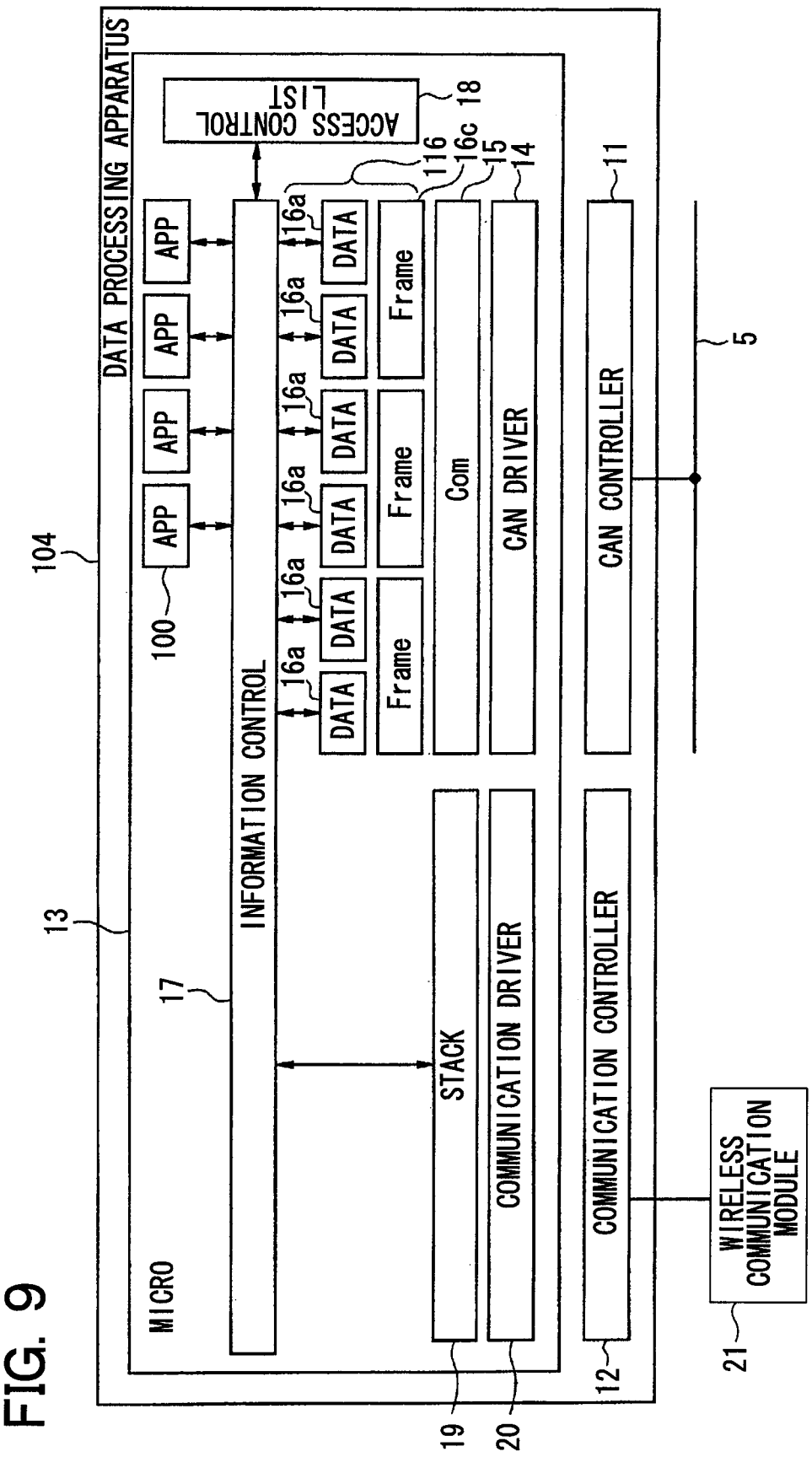
FIG. 9 is a block diagram schematically illustrating the electric configuration of a transmission/reception system for vehicle data according to a second embodiment.
Figure 10:
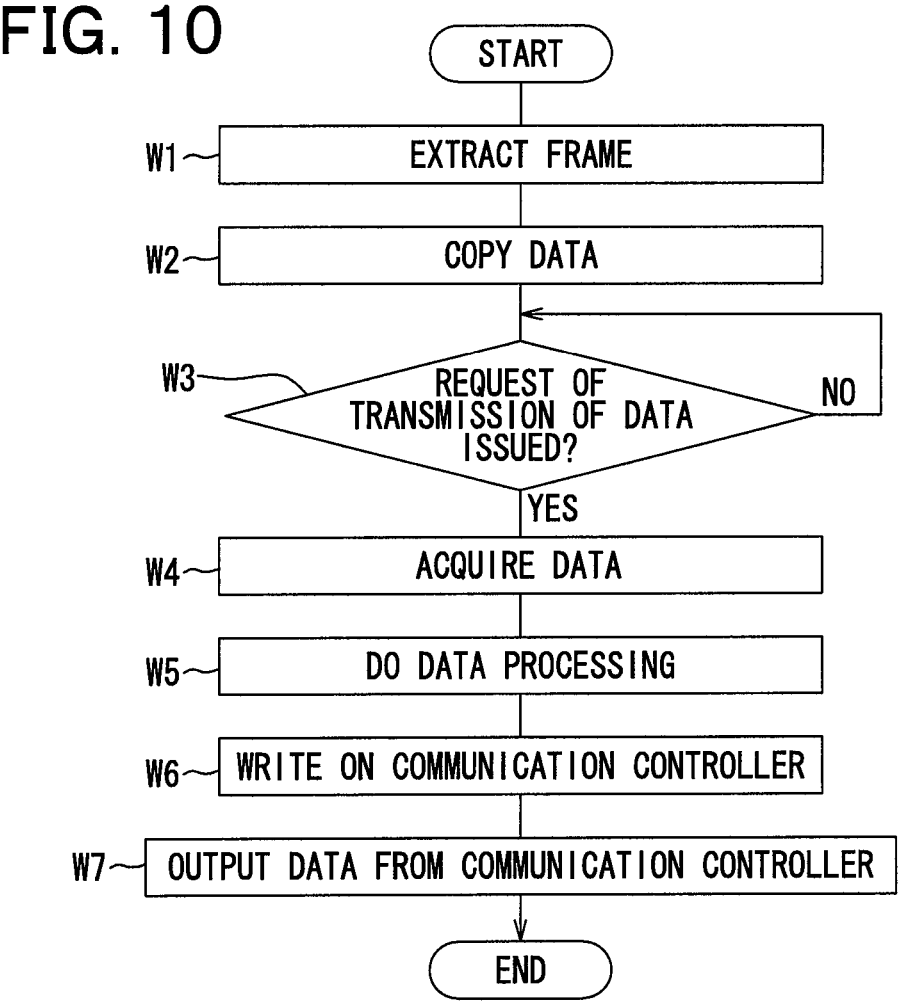
FIG. 10 is a flowchart schematically illustrating the content of processes executed by the data processing apparatus.

FIGS. 9 and 10 illustrate the second embodiment. The second embodiment indicates the configuration in which the external communication buffer 16b is not provided. The first embodiment indicates that the data processing apparatus 4 previously processes data before receiving a request of transmission from a device such as the mobile terminal 8 or the center device 6, and stores the processed data into the external communication buffer 16b. The second embodiment indicates that a data processing apparatus 104 processes data at the time of receiving a request of transmission from the device 8 or 6.

The data processing apparatus 104 in FIG. 9 that is an alternative to the data processing apparatus 4 in FIG. 1 includes an external communication buffer 16a as data storage portion 116 that is an alternative to the data storage portion 16, but does not include the external communication buffer 16b. As illustrated in the flowchart in FIG. 10 in place of FIG. 5, the microcomputer 13 in the data processing apparatus 104 extracts data through the in-vehicle network 5 on a frame basis (W1), and copies the data into the in-vehicle communication buffer 16a (W2). These processes are the same as those in steps T1 and T2 illustrated in FIG. 5. However, the microcomputer 13 then waits without processing the data beforehand.

When receiving a request of transmission of data (W3: YES), the information control portion 17 in the data processing apparatus 104 acquires data from the in-vehicle communication buffer 16a (W4), and processes the data (W5). The detail of the processing is similar to the process in FIG. 6, so that the description will be omitted. The data that has been processed is directly stored in the external connection stack 19. Then, the microcomputer 13 writes the data on the external connection communication controller 12 from the external connection stack 19 (W6), and the external connection communication controller 12 outputs the data to the device issuing the request of transmission, such as the mobile terminal 8 or the center device 6 outside the vehicle, through the wireless communication module 21 (W7). In this way, the data can be output to the device 6 or 8 issuing the request of transmission, when the request of transmission is issued.

As described above, according to the present embodiment, the microcomputer 13 converts vehicle data according to the data processing method described in the access control list L, when a request of data is issued from the outside of the vehicle. In this case as well, the data processing method of the vehicle data can be changed according to the classification levels I to IV, whereby the security level of the vehicle data can be changed according to the classification levels I to IV. Thus, the effect same as that in the previous embodiment can be obtained.

Third Embodiment

Figure 11:
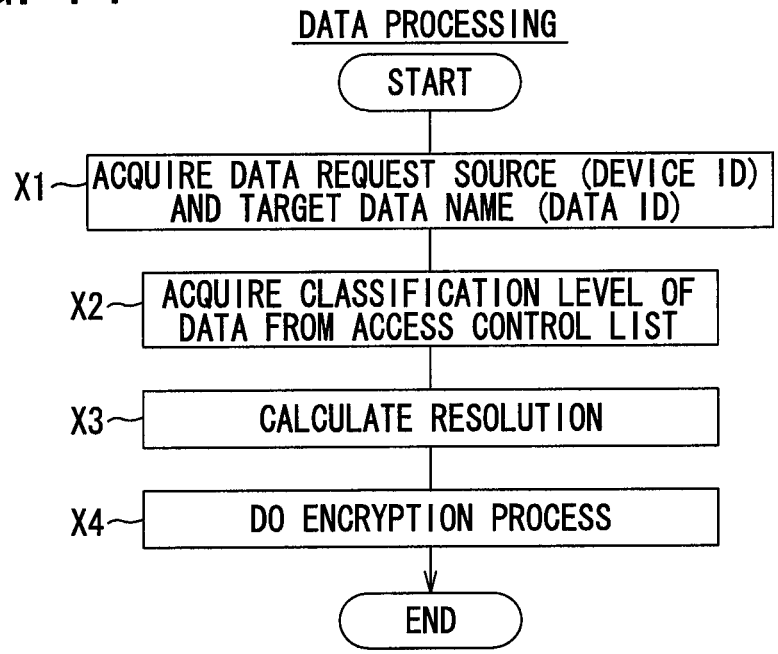
FIG. 11 is a flowchart schematically illustrating the content of a data processing according to a third embodiment.
Figure 12A:
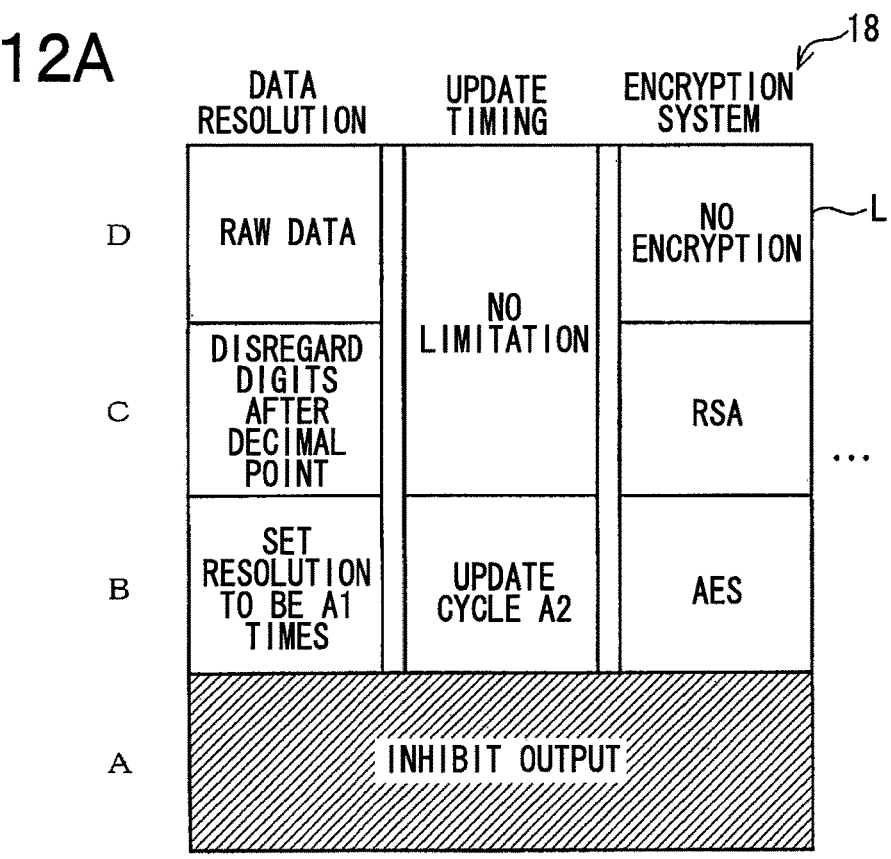
FIG. 12A is a diagram illustrating the content of an access control list that illustrates one example of classification of persons or applications and data processing methods.
Figure 12B:
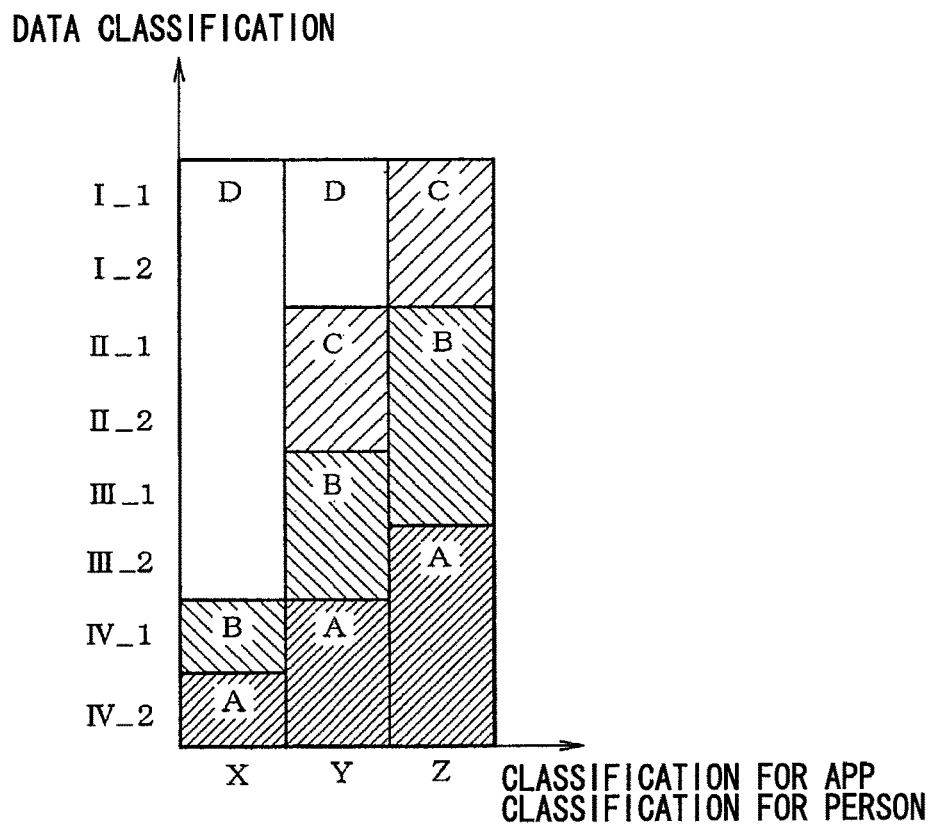
FIG. 12B is a diagram illustrating the content of an access control list that illustrates one example of classification of persons or applications and data processing methods.

FIGS. 11 to 12B illustrate the third embodiment. The third embodiment indicates that security measures are set for each of devices issuing a request of transmission of data or each of application classifications. The first embodiment indicates the manner in which the security measures are changed for each of the classification levels I to IV for vehicle data. On the other hand, in the present embodiment, the security measure is changeable for each of devices issuing a request of transmission of data or each of use cases of application, in addition to the manner described above.

An application is installed in an external device such as the mobile terminal 8 or the center device 6, and the external device can access to the data processing apparatus 4 in the vehicle from the outside of the vehicle through the operation of the application. Although the access source varies according to information such as an ID attribute of the mobile terminal 8 or the center device 6 (terminal information, device information), personal information (privacy information) of the owner of the device, a used application, and the like, the ID information of the device issuing the request is registered in advance before the request of transmission of data is issued (see FIG. 4 and its description) as described in the above embodiments.

In this case, access right (whether access is permitted or not, security measures (data processing method)) may be set for each device, each application, each user of application, or each developer of application. Alternatively, the access right may be set for each group such as the job or department of each developer who is the user, and/or for each group such as a category or genre of the application, for example.

For example, in the case where the center device 6 issues a request of data, it may be set such that the security level (classification level) is kept low for the operator of the center device 6, while the security level (classification level) is raised for a borrower (for example, a service provider such as a courier) of the mobile terminal 8.

From another viewpoint, in the case where a device in the center device 6 issues a request of data and the security (confidentiality) of the communication network 7 between the center device 6 and the vehicle 2 is sufficiently ensured, it may be set such that the security level (classification level) is kept low for the center device 6, contrary to the above case. On the other hand, in the case where the mobile terminal 8 issues a data request and the security of the in-vehicle communication 9 is not sufficiently ensured, the security level (classification level) may be raised for the mobile terminal 8.

In the case where the more detailed security measure is taken, the classification may be multi-dimensionally set such as the classification levels I to IV described in the first embodiment and the classification level for a person or application. FIG. 12A illustrates the outline of the classification level, and FIG. 12B illustrates that the classification is multi-dimensionally set. The contents illustrated in FIGS. 12A and 12B are stored in the access control list storage portion 18 as the access control list L.

The vertical axis indicates the classification levels I to IV described in the first embodiment, and the horizontal axis indicates the classification levels X to Z for applications. Note that each of the classification levels I to IV is further classified into two (the classification level marked with "_1"

indicates low security level and the classification level marked with "_2" indicates high security level on the vertical axis in FIG. 12B).

Supposing that the horizontal axis indicates the classification for a person, the classification level X on the horizontal axis is assigned to the ID information of a person having relatively higher authority of handling data, such as the owner of the mobile terminal 8 or a trusted operator of the center device 6, for example. The classification level Y on the horizontal axis is assigned to the ID information of a person having authority not so higher than the owner but having relatively high reliability, such as a car distributer (dealer). The classification level Z on the horizontal axis is assigned to the ID information of a specific service provider such as a borrower of the mobile terminal 8 or a courier. For example, the classification level Z of the horizontal axis is assigned to the ID information of a person having lower reliability than the owner.

Supposing that the horizontal axis indicates the classification for an application, the classification level X on the horizontal axis is assigned to an application requiring personal authentication (for example, an application requiring a log-in password), and the classification levels Y and Z are assigned to applications accessible to the public. Further, these classifications may be set for each group of persons or each group of applications.

As indicated in the two-dimensional security level illustrated in FIG. 12B, the security level for the classification level X is set to be relatively low, and the security level for the classification level Z is set to be relatively high. This is based on the scheme in which, when a request of transmission of vehicle data is issued from a person or application having high reliability, the security may be kept low, and when a request of transmission of vehicle data is issued from a person or application having low reliability, the security has to be kept high.

As illustrated in FIG. 11 that schematically indicates the data processing method by the data processing apparatus 4, after acquiring the source from which the data request is issued (device ID) and the target data name (data ID) (X1), the data processing apparatus 4 acquires the classification levels from the classification levels I to IV and X to Z from the access control list L illustrated in FIGS. 12A and 12B (X2), calculates resolution according to the classification level described in the access control list L (X3), and performs the encryption process (X4). Then, the microcomputer 13 in the data processing apparatus 4 transmits the vehicle data that has been processed to the source of the data request. In this case, converted data that has been processed may be prepared in advance in the external communication buffer 16b as described in the first embodiment, or as in the second embodiment, the external communication buffer 16b may not be provided, the data conversion process may be performed at the time of receiving a data request from the outside, and the resultant data may be transmitted. In this way, the process according to the present embodiment is implemented.

According to the present embodiment, in the case where the access control list storage portion 18 stores the data processing method in the access control list L for each of applications requesting vehicle data or each of application groups formed by classifying the applications, the information control portion 17 can convert or process the vehicle data according to the data processing method separately for each of the applications or application groups. Thus, security can be enhanced.

Further, in the case where the access control list storage portion 18 stores the data processing method for each of users using vehicle data or for each of groups of users, the information control portion 17 can convert or process the vehicle data according to the data processing method separately for each of the users or groups. With this, it may be possible to secure security.

Further, in the case where the access control list storage portion 18 multi-dimensionally stores the data processing method for each of the classification levels I to IV illustrated in the first embodiment and for each of applications or each of application groups, the security can be more enhanced in comparison with the process in the first embodiment, for example.

In addition, in the case where the access control list storage portion 18 multi-dimensionally stores the data processing method for each of the classification levels I to IV illustrated in the first embodiment and for each of users or user groups, the security can be more enhanced in comparison with the process in the first embodiment, for example.

When the external communication buffer 16b stores converted data that has been previously processed for each of applications requesting vehicle data or each of application groups formed by classifying the applications, the external communication buffer 16b can immediately respond to the request of transmission of data issued from the outside.

When the external communication buffer 16b stores the converted data that has been previously processed for each of users requesting vehicle data or for each user group, the external communication buffer 16b can immediately respond to the request of transmission of data issued from the outside.

Other Embodiments

The present disclosure is not limited to the embodiments described above, and modifications or extensions described below are possible.

The access control list storage portion 18 that stores the data processing method itself according to each of the classification levels I to IV has been described above. However, the access control list storage portion 18 may store ID information or the like of the data processing method according to each of the classification levels I to IV, and the detail of the data processing method may be separately stored. The "data processing method" according to the present disclosure includes this configuration.

For example, an intruder sensor (not illustrated) may be installed in the vehicle 2 in case of theft. In such a case, the sensor information of the intruder sensor is accumulated in the in-vehicle communication buffer 16a through the in-vehicle network 5. The present embodiments may be applied to the configuration in which, when an internal event concerning the detection of intrusion, for example, by the intruder sensor (not illustrated) installed in the vehicle 2 occurs, the microcomputer 13 voluntarily outputs vehicle data to the center device 6 outside the vehicle. In such a case as well, the effect described in the embodiments described above can be obtained. The configurations of the embodiments described above can be applied independently or in combination.

The data processing apparatus 4 and 104 correspond to a vehicular data conversion apparatus in the present disclosure, the in-vehicle communication buffer 16a corresponds to an acquisition portion, the external communication buffer 16b corresponds to a second storage portion, the information control portion 17 corresponds to a conversion portion, the access control list storage portion 18 corresponds to a first storage portion, and the external connection stack 19 corresponds to an output portion.

It is noted that a flowchart or the processing of the flowchart in the present application includes sections (also referred to as steps), each of which is represented, for instance, as S1, U!, T1, V1, W1, and X1. Further, each step can be divided into several sub-steps while several steps can be combined into a single step.

While various embodiments, configurations, and aspects of the vehicular data conversion apparatus and the vehicular data output method according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A vehicular data conversion apparatus comprising:
    an acquisition portion that acquires vehicle data from at least two ECUs connected to a vehicle network of a vehicle;
    a first storage portion that stores a data processing method to convert vehicle data acquired by the acquisition portion to data being output to an outside of the vehicle based on each classification level of security, which is classified in advance corresponding to the vehicle data acquired by the acquisition portion, the data processing method concerning at least one of data resolution indicative of data precision of the vehicle data or update timing of the vehicle data;
    a conversion portion that converts the vehicle data to the data being output to the outside of the vehicle in accordance with the data processing method stored in the first storage portion; and
    an output portion that outputs the data being output to the outside of the vehicle to a device outside the vehicle.

2. The vehicular data conversion apparatus according to claim 1, wherein:
    the first storage portion stores the data processing method for each of groups classified in accordance with the vehicle data.

3. The vehicular data conversion apparatus according to claim 1, wherein:
    the first storage portion is capable of changing and setting the data processing method corresponding to the vehicle data in accordance with a change in a security policy.

4. The vehicular data conversion apparatus according to claim 1, wherein:
    the first storage portion stores the data processing method for each of applications requesting the vehicle data or for each of application groups configured by classifying the applications.

5. The vehicular data conversion apparatus according to claim 1, wherein:
    the first storage portion stores the data processing method for each of users using the vehicle data or for each of groups of the users.

6. The vehicular data conversion apparatus according to claim 1, wherein:
    the first storage portion stores the data processing method for each of classification levels classified in accordance with the vehicle data, and also for each of applications requesting the vehicle data or for each of application groups configured by classifying the applications.

7. The vehicular data conversion apparatus according to claim 1, wherein:
    the first storage portion stores the data processing method for each of classification levels classified in accordance with the vehicle data and also for each of groups of users using the vehicle data.

8. The vehicular data conversion apparatus according to claim 1, wherein:
    the first storage portion stores, as the data processing method, one of or a combination of two or more of a resolution processing method of the vehicle data, an update cycle of data, an encryption system of data, and a falsification detection process of data.

9. The vehicular data conversion apparatus according to claim 1, further comprising:
    a second storage portion that stores converted data which has been processed in advance by the data processing method stored in the first storage portion,
    wherein:
    the output portion outputs the converted data stored in the second storage portion when the vehicle data is requested from the outside of the vehicle.

10. The vehicular data conversion apparatus according to claim 9, wherein:
    the second storage portion stores the converted data processed in advance for each of applications requesting the vehicle data or for each of application groups configured by classifying the applications.

11. The vehicular data conversion apparatus according to claim 9, wherein:
    the second storage portion stores the converted data processed in advance for each of users using the vehicle data or for each of groups of the users.

12. The vehicular data conversion apparatus according to claim 1, wherein:
    the conversion portion performs conversion by the data processing method stored in the first storage portion when the vehicle data is requested from the outside.

13. A vehicular data conversion apparatus comprising:
    an acquisition portion that acquires vehicle data from at least two ECUs connected to a vehicle network of a vehicle;
    a first storage portion that stores a data processing method to convert vehicle data acquired by the acquisition portion to data being output to an outside of the vehicle based on each classification level of security, which is classified in advance corresponding to the vehicle data acquired by the acquisition portion;
    a conversion portion that converts the vehicle data to the data being output into the outside of the vehicle in accordance with the data processing method stored in the first storage portion; and
    an output portion that outputs the data being output to the outside of the vehicle to a device outside the vehicle;
    a second storage portion that stores converted data which has been processed in advance by the data processing method stored in the first storage portion,
    wherein:
    the output portion outputs the converted data stored in the second storage portion when the vehicle data is requested from the outside of the vehicle;
    the first storage portion stores an update timing in accordance with the classification level as the data processing method; and the second storage portion stores the converted data processed in advance for each of classification levels of the vehicle data at the update timing stored in the first storage portion.

14. The vehicular data conversion apparatus according to claim 13, wherein:
the first storage portion stores the data processing method for each of groups classified in accordance with the vehicle data.

15. The vehicular data conversion apparatus according to claim 13, wherein:
the first storage portion is capable of changing and setting the data processing method corresponding to the vehicle data in accordance with a change in a security policy.

16. The vehicular data conversion apparatus according to claim 13, wherein:
the first storage portion stores the data processing method for each of applications requesting the vehicle data or for each of application groups configured by classifying the applications.

17. The vehicular data conversion apparatus according to claim 13, wherein:
the first storage portion stores the data processing method for each of users using the vehicle data or for each of groups of the users.

18. The vehicular data conversion apparatus according to claim 13, wherein:
the first storage portion stores the data processing method for each of classification levels classified in accordance with the vehicle data, and also for each of applications requesting the vehicle data or for each of application groups configured by classifying the applications.

19. The vehicular data conversion apparatus according to claim 13, wherein:
the first storage portion stores the data processing method for each of classification levels classified in accordance with the vehicle data and also for each of groups of users using the vehicle data.

20. The vehicular data conversion apparatus according to claim 13, wherein:
the first storage portion stores, as the data processing method, one of or a combination of two or more of a resolution processing method of the vehicle data, an update cycle of data, an encryption system of data, and a falsification detection process of data.

21. A vehicular data output method comprising:
acquiring vehicle data from at least two ECUs connected to a vehicle network of a vehicle;
storing in a first storage portion a data processing method to convert acquired vehicle data to data being output to an outside of the vehicle based on each classification level of security, which is classified in advance corresponding to the acquired vehicle data;
converting the acquired vehicle data to the data being output to the outside of the vehicle in accordance with the data processing method stored in the first storage portion;
storing in a second storage portion converted vehicle data which has been processed in advance by the data processing method stored in the first storage portion; and
outputting with an output portion the converted vehicle data stored in the second storage portion to the outside of the vehicle to a device outside of the vehicle when the converted vehicle data is requested from the outside of the vehicle;
wherein:
the first storage portion stores an update timing in accordance with the classification level as the data processing method; and
the second storage portion stores the converted vehicle data processed in advance for each of classification levels of the vehicle data at the update timing stored in the first storage portion.

* * * * *